May 24, 1960 P. E. YOST 2,937,825
BALLOON AND LOAD BEARING ATTACHMENT
Filed April 11, 1956

INVENTOR.
PAUL E. YOST
BY Robert E. Howe
ATTORNEY

United States Patent Office 2,937,825
Patented May 24, 1960

2,937,825

BALLOON AND LOAD BEARING ATTACHMENT

Paul E. Yost, Hugo, Minn., assignor to General Mills, Inc., a corporation of Delaware Filed Apr. 11, 1956, Ser. No. 577,530

4 Claims. (Cl. 244—31)

This invention relates to improvements in balloons, and more particularly to a load-bearing attachment means to increase the volume for small balloons. The balloons are similar to those described and disclosed in Huch et al. Patent No. 2,666,600 and Huch Patent No. 2,666,601.

It is desirable in small balloons to provide a simple load-bearing means which may be readily affixed to the balloon to carry loads such as packages of leaflets and the like.

It is therefore an object of this invention to provide a simple load-bearing means, one part of which is insertable in the balloon itself and the other part is fastened exteriorly of the balloon for affixing the load.

It is a further object of my invention to provide a dowel means insertable in the balloon, and a clamping means for gripping the dowel means exteriorly of the balloon with said clamping means adapted to support a load to be transported by the balloon.

It is a further object of my invention to provide a load-bearing means which permits the height of the balloon at launching to be normal to the load-carrying means, thus allowing a balloon having more lift adaptable for launching from confined quarters.

It is another object of my invention to provide a simple attachable load-bearing means allowing the balloon to be shipped or transported at with the load-carrying means to be attached easily at the launching site.

It is a further object of my invention that the affixing of said load-carrying means does not interfere with the use of the full volume of the balloon.

It is an object of my invention to provide a rigid elongate member in the base of a balloon envelope to which a load bearing attachment may be affixed centrally of the base at said rigid member.

It is a further object of my invention to load rectangular shaped balloon envelopes centrally of the base so that a balloon of greater volume can be launched from confined quarters and better flight characteristics obtained than when said load is affixed at one of the corners of the rectangular balloon envelope.

Other objects and advantages will be apparent from the following specification taken in connection with the accompanying drawings, in which.

Figure 1:
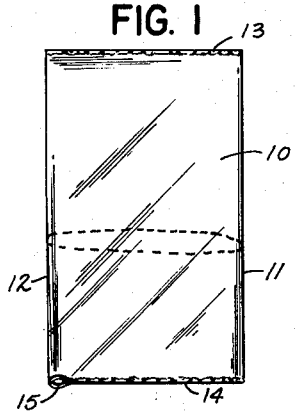
Figure 1 is a plan view showing the sealed balloon envelope.

Referring to Fig. 1, a sealed balloon envelope 10 is illustrated. The material of the envelope may be of any suitable type but a thermoplastic is preferred, such as polyethylene, which is a non-extensible material. The balloon envelope 10 is formed as described in Huch et al. Patent No. 2,666,600 and is completely sealed, having side edges 11 and 12 closed by virtue of the fact that the material was originally tubular in form and having the end edges sealed or welded except for the slit 15 with sealing beads 13 and 14. This balloon envelope is flat and contains no air and can be stacked or folded for storage.

Such balloon envelope is preferably small in size so as to be economical and, since the material is light in weight, a small size balloon is capable of ascending to high altitudes. For example, the balloon of the present embodiment may have edgewise dimensions of 108 inches by 168 inches.

Figure 2:
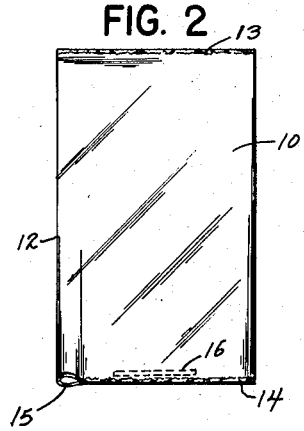
Fig. 2 is a plan view showing the sealed balloon envelope provided with a slit and dowel means inserted therein.
Figure 3:
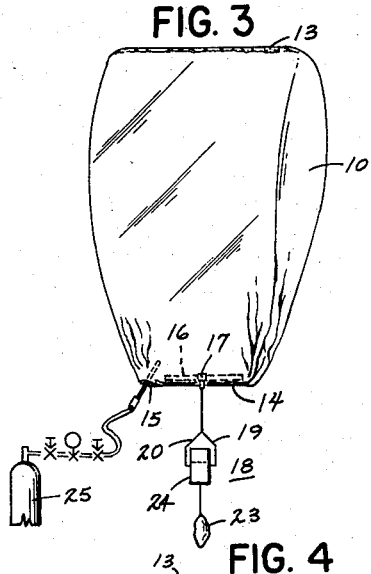
Fig. 3 is a perspective view illustrating the inflation of the balloon.
Figure 5:
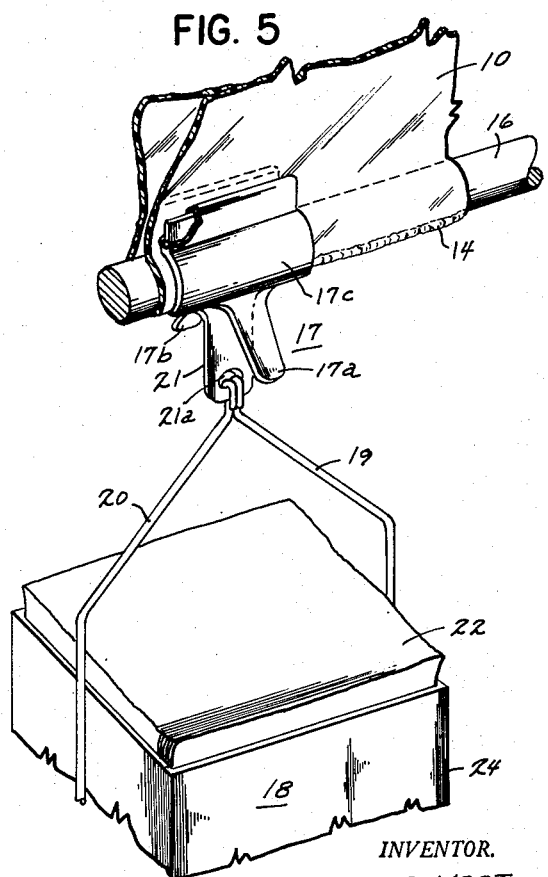
Fig. 5 is an enlarged perspective view of the load attaching means with load attached thereto.

In Fig. 2, one corner of the balloon envelope 10 is provided with a slit or opening 15. This opening is useful in filling the balloon with gas from a cylinder 25 as shown in Fig. 3 and in providing an opening for inserting a rod or dowel 16 within the balloon envelope. Such rod or dowel 16 is made of wood or other lightweight material and does not necessarily extend to full length of seam 14. The dowel 16 is preferably rounded as shown in Fig. 5 to prevent snagging of the balloon material and to provide a suitable gripping surface for pinch clamp 17.

Figure 4:
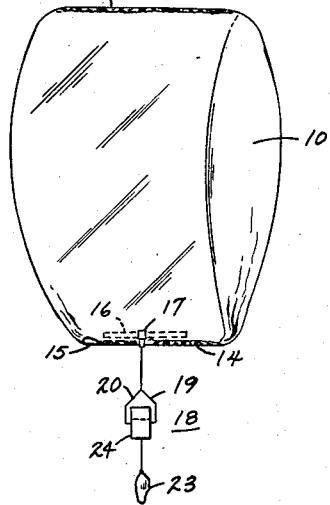
Fig. 4 is a perspective view of the balloon in flight with load attached.

The dowel rod 16, cut shorter than the width of the balloon, provides a base for the balloon which is not entirely rigid and slit 15 can serve as a valving aperture as the slit will tend to be closed by the fold of balloon material during ascent of the balloon. To further clarify this matter the balloon envelope 10 is only partially inflated to the general extent shown in Fig. 3. The inflation is done carefully so that only the desired amount of gas is permitted to enter the balloon. By inflating in this manner the walls of the upper portion of the balloon are forced apart while the lower portion of the walls is in a collapsed state due to the external force exerted by atmospheric pressure. As the balloon rises expansion of the gas within the balloon provides total inflation as seen in Fig. 4 and any excess gas is valved through the opening 15.

A load-carrying device 18 is secured to pinch clamp 17 by wires 19 and 20 which connect to aperture 21a of load-bearing member 21 which is welded to pinch clamp 17. The pinch clamp 17 is affixed to the balloon by simultaneously depressing handles 17a and 17b, which causes clamping portion 17c to open to allow clamp 17 to engage the dowel and balloon material at the dowel portion. The clamp portion 17c may be covered with rubber or other protective material to prevent injury to the balloon material. Upon release of handles 17a and 17b, the clamp grips the dowel between the balloon material along seam 14.

The load-carrying device 18 of the present embodiment is of the type described and disclosed in Winker application Ser. No. 532,714, filed September 6, 1955, now Patent No. 2,865,583, and assigned to the same assignee. In general, a box structure 24 is pivotally mounted on wires 19 and 20. Leaflets 22 are stored in the upper portion of the box structure 24 and at the lower part of the box is attached a bag 23 containing particles of Dry Ice. Evaporation of the Dry Ice particles after a predetermined period of time causes the top of box 24 to tip downwardly in relation to the pivotal attachment to the balloon, thus allowing the leaflets to fall out and scatter.

Thus, I have disclosed and described a load-bearing attachment means which is readily attachable to a balloon envelope and being affixed along a seam allows full use of the volume of the balloon, with no need to collect a portion of the balloon material for affixing a load bearing attachment. Since many variations of the exact details of construction shown in the drawings will occur to persons skilled in the art in view of the teachings of this application, it is intended that this invention should not be limited to the exact structure shown but only by the scope and spirit of the attached claims.

Now, therefore, I claim:

1. A balloon and load-bearing attachment comprising an envelope formed of non-extensible material and containing a volume of lifting gas, said envelope being substantially rectangular in shape and provided with a slit on a lower edge portion of said envelope, said slit being of lesser extent than said edge portion and closed during a part of the ascent of said balloon by atmospheric pressure, a rod means within said balloon of lesser extent than said edge portion, clamping means including a load support member attached to said envelope and said rod means whereby a load is attached to said load support member.

2. A balloon and load-bearing attachment comprising an envelope of non-extensible material and containing a volume of lifting gas, said envelope being provided with a slit, a rod means located within said envelope through said slit, said rod means maintaining a portion of said envelope rigid but of such extent that said slit is closed by atmospheric pressure during a part of the ascent of said balloon, and clamping means attached to said envelope at said rod means for supporting a load to be carried by said balloon.

3. The combination including a non-extensible balloon having a substantially rectangular envelope, a slit provided in said envelope at the base thereof, rod means within said envelope and resting on the base within said envelope, a clamping means for supporting a load beneath said balloon, said clamping means engaged with said balloon envelope and said rod means; said balloon being inflated through said slit and a load attached to said clamping means.

4. The combination including a non-extensible balloon having a substantially rectangular envelope containing a volume of lifting gas, one edge of said envelope being the base of said envelope, said edge provided with a slit, said slit being substantially closed by atmospheric pressure during part of the ascent of said balloon, and continued ascent of said balloon opens said slit for excess gas release, rod means located within said balloon envelope through said slit, said rod means being of lesser extent than the total extent of said base, said rod being centrally located along the base, and load bearing means in clamping engagement with said rod and said envelope.

References Cited in the file of this patent

UNITED STATES PATENTS

| | | |
|---|---|---|
| 897,594 | Craw | Sept. 1, 1908 |
| 1,233,141 | Suzuki | July 10, 1917 |
| 2,008,552 | Jacobs | July 16, 1935 |
| 2,666,601 | Huch | Jan. 19, 1954 |

FOREIGN PATENTS

| | | |
|---|---|---|
| 23,907 | Great Britain | Nov. 7, 1908 |
| 3,029/26 | Australia | May 16, 1927 |